United States Patent [19]
Farrar, Jr.

[11] 3,922,918
[45] Dec. 2, 1975

[54] ORTHOPEDIC MUSCLE TESTING APPARATUS

[76] Inventor: Edward L. Farrar, Jr., 117 E. Copeland, Orlando, Fla. 32806

[22] Filed: Aug. 22, 1974

[21] Appl. No.: 499,472

[52] U.S. Cl. ................................................. 73/379
[51] Int. Cl.² ........................................... G01L 5/02
[58] Field of Search ...................... 73/379, 380, 381; 272/82 R, 83 R, 79 R, 72

[56] References Cited
UNITED STATES PATENTS

| | | | |
|---|---|---|---|
| 63,846 | 4/1867 | Brady | 272/72 |
| 177,251 | 5/1876 | Johnson | 73/379 |

Primary Examiner—Herbert Goldstein
Assistant Examiner—Anthony V. Ciarlante
Attorney, Agent, or Firm—Duckworth, Hobby & Allen

[57] ABSTRACT

Muscle testing apparatus for simultaneously measuring different muscles includes a frame having two shafts rotatably pinned thereto about respective pivot axes. A lever is also rotatably pinned to the frame on another pivot axis, and two strain measuring gauges are coupled between the shafts and the lever. The shafts are then rotated in opposite directions, as with two hands of a patient, to thereby effect a strain measurement on the corresponding strain gauge.

12 Claims, 3 Drawing Figures

ORTHOPEDIC MUSCLE TESTING APPARATUS

BACKGROUND OF THE INVENTION

1. Field of the Invention

The present invention relates to muscle power determining devices and methods, and in particular to such devices and methods wherein the relative strengths of different muscles or of different muscle groups are measured.

2. Description of the Prior Art

In the field of orthopedic medicine, it is often necessary to treat pain complexes of the vertebral column. Physical findings related to pain complexes have not been widely described. However, the patient may exhibit a loss of weight or power in one leg. In U.S. Pat. No. 3,270,558, Barret et al discloses a balance which measures the weight of one leg relative to the other to determine if a weight discrepancy exists. However, this factor alone is insufficient for diagnostic purposes, since leg weight may vary dependent upon a variety of other factors. Other techniques are also disclosed in the background of the Barret et al patent. Most, if not all, of these techniques suffer similar diagnostic limitations.

In the field of muscle exercising and strength measuring devices there are a wide variety of devices and methods for measuring the composite strength of one, or a group of muscles. In U.S. Pat. No. 3,752,144 to Weigle, there is disclosed a muscular evaluation method of testing apparatus employing electronic means for providing a visual indication of the amount of strength measured by the apparatus. Haenze, in U.S. Pat. No. 714,477, discloses a cylindrical strain gauge measuring muscle strength, in which a spring shaft is biased with a cylindrical housing such that axial pull of the shaft deflects the top portion of the shaft, which deflection can be described by a scale along a longitudinal slot in the cylindrical housing. Johnson, in U.S. Pat. No. 1,115,826 discloses another type of strength testing apparatus.

SUMMARY OF THE INVENTION

The present invention contemplates an orthopedic muscle testing apparatus comprising first and second means for measuring the respective strengths of two paired muscles, and means for simultaneously operating the first and second means.

The present invention also contemplates a method of measuring the relative strengths of two different muscles in which the individual strength of the two muscles are measured and then a visual comparison is made of these two measured strengths.

The apparatus and method in the present invention are based in principle on the recognition that the muscles of certain muscle groups may be significantly weakened as a result of abnormalities within the vertebral column.

THE DRAWING

DETAILED DESCRIPTION

Figure 1:
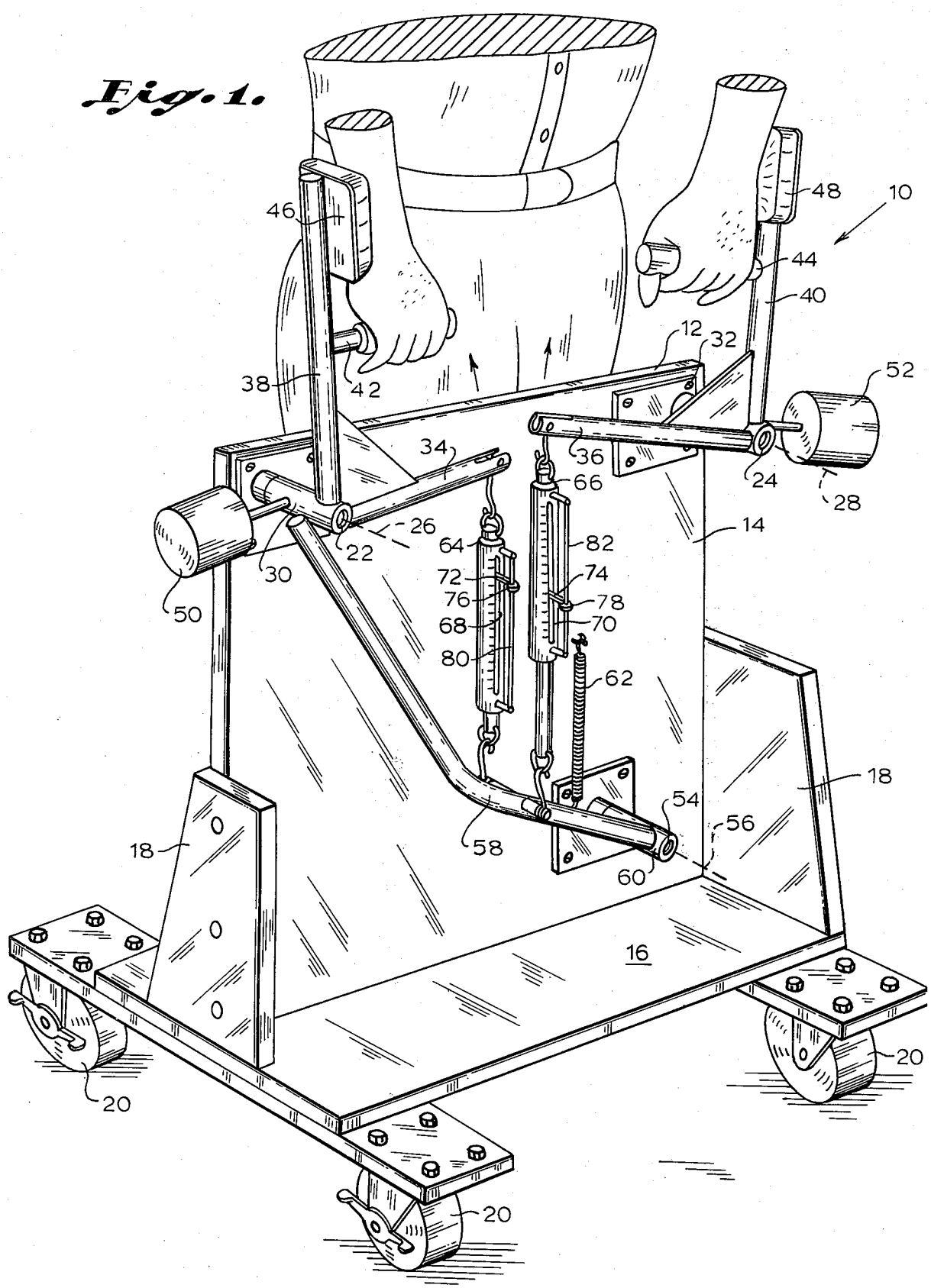
FIG. 1 is a perspective view of apparatus in accordance with the present invention.

An embodiment of the present invention will now be described with reference to FIG. 1.

The muscle tester, referred to generally as 10, comprises a frame member 12 having a flat surface 14 supported in the vertical position by a base 16 and struts 18. Preferably, the tester 10 is mounted on wheels 20.

The tester 10 further comprises two spaced pins 22, 24 extending substantially normal to the flat surface 14. Each pin 22, 24 define a corresponding pivot axis 26, 28 for a shaft and support rod combination, described next.

Each shaft and support rod combination comprises a hollow cylinder 30, 32 axial with, and rotatable about a corresponding one of the pins 22, 24. A shaft 34, 36 is fixed normal to the respective cylinder 32, the two shafts directed one toward the other. A support rod 38, 40 extends substantially normal to the corresponding cylinder 30, 32 and shaft 34, 36. A gripping bar 42, 44 is intermediate between the extremities of, and normal to, the respective support rod 38, 40 and substantially parallel with the corresponding shaft 34, 36. The gripping bars 42, 44 are directed each one toward the other, each having a grip (not numbered) fitted thereon. The distal extremity of each support rod 38, 40 is terminated with a sidewardly facing pad 46, 48. A counterweight 50, 52 extends substantially normal to the respective cylinder 30, 32 and support rod 38, 40 and substantially parallel with the respective shaft 34, 36.

Referring now to the lower right hand portion of the flat surface 14, a third pin 54 extends substantially normal to that surface and defines a pivot axis 56 about which is rotatably mounted a lever 58 fixed to a cylinder 60. A spring 62 supports the lever 58, and the distal extremity of the lever bears against the cylinder 30 when rotated upward.

In accordance with the present invention, two strain measuring means are provided, each of which are disposed between one of the shafts 34, 36 and the lever 58. In this embodiment, each strain measuring means comprises a spring tensioned pull gauge 64, 66 essentially identical to that disclosed in the aforementioned patent to Haenze, which includes a longitudinal slot 68, 70, a tab 72, 74 extending through the corresponding slot, and a deflection indicator 76, 78 engaged by the respective tab. Each deflection indicator 76, 78 is carried by a rod 80, 82 fixed to the corresponding gauge 64, 66 along the slot 68, 70.

Operation of the tester 10 will now be described. As shown in FIG. 1, the patient under test stands on the side of the frame 12 opposite the surface 14, and grasps the gripping bars 42, 44 with the respective right and left hands, using the pads 46, 48 as a support for the elbows. The patient then pulls upward on both of the gripping bars 42, 44 using an even pulling motion. As indicated by arrows in FIG. 1, one of the shafts 34 rotates in a clockwise direction and the shaft 36 rotates in a counter-clockwise direction. The resulting amount of rotation caused by the pulling of the respective right and left arms of the patient is measured on the gauges 64, 66. These measurements may then be compared and if it is determined that there is significant disparity between the strength of any one muscle, or the muscle group associated with one arm relative to the other, this can be determined. As described above, this may be a manifestation of a dislocated spinal vertebra.

Figure 2:
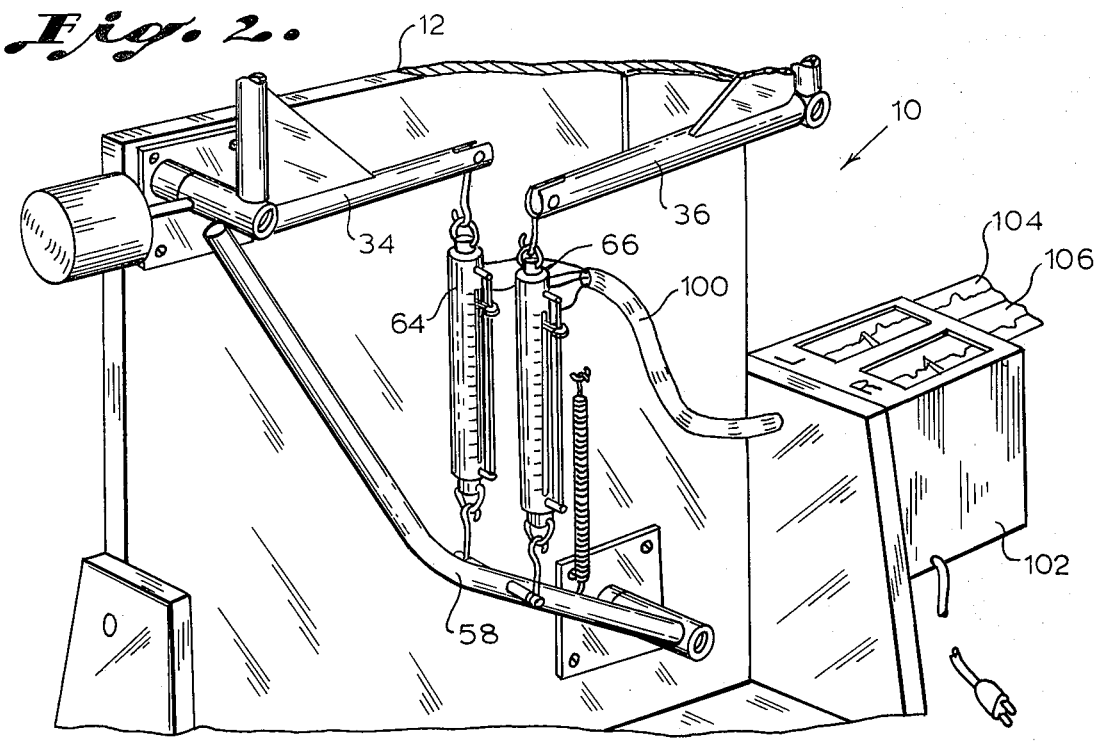
FIG. 2 is a front view of an alternate embodiment of the apparatus of FIG. 1.

An alternate arrangement of the tester 10 is shown in FIG. 2. This embodiment of the tester 10 is essentially identical to that shown in FIG. 1, and further includes an electronic chart recorder 102 coupled to the respective strain gauges 64, 66 via an electrical cable 100. In this embodiment, the strain gauges are of a known type which will provide an electrical output representative of the amount of axial strain between the shafts 34, 36 and the lever 58. This electrical output is conducted via cable 100 to the chart recorder 102, where these electrical outputs are converted to visual indications 104 and 106 in the form of a pen chart recording. The particular form of the chart recorder and the electrical strain gauge do not constitute a part of this invention, and it will be understood by those skilled in the art that a wide variety of apparatus are commercially available for this purpose.

Figure 3:
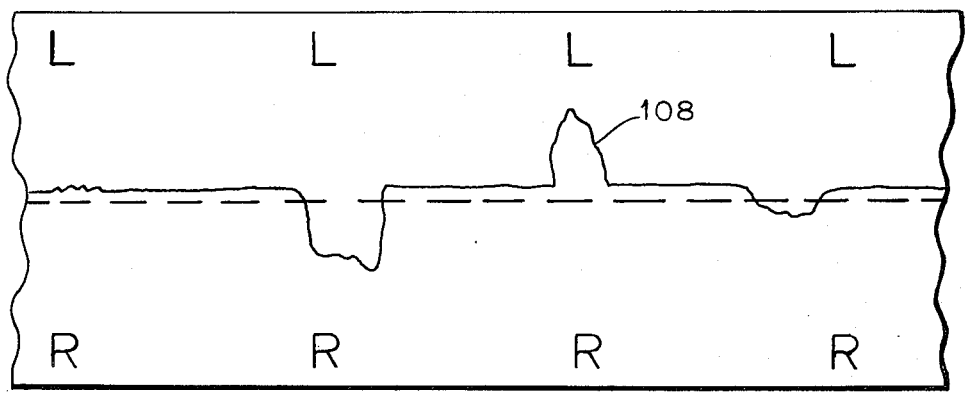
FIG. 3 is a top plan view of a visual indication of an output of apparatus in accordance with the present invention.

Shown in FIG. 3 is a representation of a preferred output from a chart recorder similar to the recorder 102 of FIG. 2, except that the recorder is provided with means for comparing the electrical signals and providing a single output 108 representative of a comparison between the relative strengths of the right and left hand of the patient under test. Again, the specific electronic apparatus to accomplish this function is well known in the art, and does not constitute a part of this invention. Noting FIG. 3, an output of this nature will readily provide a visual indication of a comparison between the output of the strain gauges, in order to determine the relative strengths of the muscle groups involved.

I claim:
1. Muscle testing apparatus comprising:
   a frame;
   first means for measuring the strength of one muscle, having a first shaft rotatable about a first pivot axis, and first strain measuring means coupled to said shaft;
   second means for measuring the strength of another muscle, having a second shaft rotatable about a second pivot axis, and second strain measuring means coupled to said second shaft;
   means for operating said first and second means;
   a pivotal lever coupled to said frame; and wherein said first and second strain measuring means are coupled between said lever and said respective first and second shafts.

2. The apparatus recited in claim 1 further comprising means for comparing muscle strength indications from said first and second means.

3. The apparatus recited in claim 2 wherein said comparing means further comprises means for allowing simultaneous comparison of said indications from said first and second means.

4. The apparatus recited in claim 3 wherein said first and second strain measuring means are fixed respectively to said first and second shafts so as to measure strain caused by rotation of the shafts associated therewith about the respective pivot axis in one direction, with said rotation of said shafts being in opposite directions.

5. The apparatus recited in claim 4 wherein said first and second pivot axes are substantially normal to, and fixed to said frame.

6. The apparatus recited in claim 5 wherein said lever is pinned to said frame at, and rotatable about a third pivot axis.

7. The apparatus recited in claim 6 further comprising means for receiving electrical outputs from said first and second strain measuring means representative of the amount of measured strain, and for providing a visual indication thereof.

8. The apparatus recited in claim 7 wherein said electrical output receiving means further comprises means for providing a visual comparison of said electrical outputs.

9. The apparatus recited in claim 8 further comprising:
   a support rod coupled with each said shaft and rotatable therewith about the respective one of said first and second pivot axes;
   a support pad fixed to each said support rod; and
   a gripping bar extending substantially normal to each said rod.

10. The apparatus recited in claim 9 further comprising a counterweight coupled with each said shaft.

11. Muscle testing apparatus for simultaneously measuring the strength of different muscles, comprising:
    a frame;
    a first shaft rotatably pinned to said frame on a first pivot axis substantially normal to said frame;
    a second shaft rotatably pinned to said frame on a second pivot axis substantially normal to said frame, said second pivot axis spaced from said first pivot axis;
    a lever rotatably pinned to said frame on a third pivot axis substantially normal thereto, said third pivot axis spaced from said first and second pivot axes;
    first strain measuring means coupled to said first shaft and said lever;
    second strain measuring means coupled to said second shaft and lever; and
    means for simultaneously rotating said first and second shafts in opposite directions to thereby effect a strain measurement on the corresponding one of said frame measuring means.

12. The apparatus recited in claim 11 wherein said simultaneous rotating means comprises:
    a hand grip with each said shaft; and
    arm supporting means spaced from said grip and carried with each shaft.

* * * * *